United States Patent
Park et al.

(10) Patent No.: US 12,043,875 B2
(45) Date of Patent: Jul. 23, 2024

(54) FERRITE-BASED STAINLESS STEEL HAVING EXCELLENT PROCESSABILITY AND HIGH-TEMPERATURE STRENGTH AND METHOD FOR MANUFACTURING SAME

(71) Applicant: POSCO, Pohang-si (KR)

(72) Inventors: Ji Eon Park, Pohang-si (KR); Il Chan Jung, Pohang-si (KR); Mi-Nam Park, Pohang-si (KR)

(73) Assignee: POSCO CO., LTD, Pohang-si (KR)

( * ) Notice: Subject to any disclaimer, the term of this patent is extended or adjusted under 35 U.S.C. 154(b) by 646 days.

(21) Appl. No.: 17/276,889

(22) PCT Filed: Aug. 22, 2019

(86) PCT No.: PCT/KR2019/010717
§ 371 (c)(1),
(2) Date: Mar. 17, 2021

(87) PCT Pub. No.: WO2020/060050
PCT Pub. Date: Mar. 26, 2020

(65) Prior Publication Data
US 2021/0348249 A1 Nov. 11, 2021

(30) Foreign Application Priority Data
Sep. 19, 2018 (KR) ........................ 10-2018-0112482

(51) Int. Cl.
| | | |
|---|---|---|
| *C22C 38/00* | (2006.01) | |
| *C21D 6/00* | (2006.01) | |
| *C21D 8/02* | (2006.01) | |
| *C21D 9/46* | (2006.01) | |
| *C22C 38/02* | (2006.01) | |
| *C22C 38/04* | (2006.01) | |
| *C22C 38/44* | (2006.01) | |
| *C22C 38/48* | (2006.01) | |

(52) U.S. Cl.
CPC .............. *C21D 9/46* (2013.01); *C21D 6/004* (2013.01); *C21D 6/005* (2013.01); *C21D 6/008* (2013.01); *C21D 8/0205* (2013.01); *C21D 8/0226* (2013.01); *C22C 38/001* (2013.01); *C22C 38/002* (2013.01); *C22C 38/02* (2013.01); *C22C 38/04* (2013.01); *C22C 38/44* (2013.01); *C22C 38/48* (2013.01); *C21D 2211/005* (2013.01)

(58) Field of Classification Search
CPC .................. C22C 38/44; C22C 38/04
See application file for complete search history.

(56) References Cited

U.S. PATENT DOCUMENTS

| | | | | |
|---|---|---|---|---|
| 11,339,460 B2* | 5/2022 | Jung | ........................ | C22C 38/48 |
| 2015/0020933 A1* | 1/2015 | Hamada | ................... | C22C 38/28 |
| | | | | 148/610 |

FOREIGN PATENT DOCUMENTS

| | | |
|---|---|---|
| CN | 108495944 A | 9/2018 |
| JP | H09-279316 A | 10/1997 |
| JP | 2004-043949 A | 2/2004 |
| JP | 2009120893 A | 6/2009 |
| JP | 2015-151555 A | 8/2015 |
| JP | 2015187290 A | 10/2015 |
| KR | 20060007441 A | 1/2006 |
| KR | 20180074079 A | 7/2018 |
| WO | 2017135240 A | 2/2018 |

OTHER PUBLICATIONS

Japanese Office Action dated Sep. 6, 2022 issued in Japanese Patent Application No. 2021-515629 (with English translation).
Japanese Notice of Allowance dated Apr. 4, 2023 issued in Japanese Patent Application No. 2021-515629 (with English translation).
Japanese Office Action dated Mar. 1, 2022 issued in Japanese Patent Application No. 2021-515629 (with English translation).
Chinese Office Action dated Apr. 13, 2022 issued in Chinese Patent Application No. 201980061268.7 (with English translation).
Chinese Office Action dated Sep. 17, 2021 issued in Chinese Patent Application No. 201980061268.7 (with English translation).
International Search Report issued in International Application No. PCT/KR2019/010717 dated Dec. 20, 2019.
Office Action issued in Korean Patent Application No. 10-2018-0112482 dated Oct. 16, 2019.
Office Action issued in Korean Patent Application No. 10-2018-0112482 dated Mar. 5, 2020.
Notice of Allowance issued in Korean Patent Application No. 10-2018-0112482 dated Apr. 14, 2020.

* cited by examiner

*Primary Examiner* — Jophy S. Koshy
(74) *Attorney, Agent, or Firm* — Morgan, Lewis & Bockius LLP

(57) ABSTRACT

Disclosed is a ferritic stainless steel with improved workability and high temperature strength through control of component composition and precipitate distribution, and a manufacturing method thereof. The ferritic stainless steel excellent in workability and high temperature strength according to an embodiment of the present disclosure includes, in percent (%) by weight of the entire composition, C: 0.0005 to 0.02%, N: 0.005 to 0.02%, Si: 0.01 to 1.0%, Mn: 0.01 to 1.2%, P: 0.001 to 0.05%, Cr: 10.0 to 25.0%, Mo: 1.5 to 3.0%, Nb: 0.3 to 0.7%, W: 0.5 to 2.0%, the remainder of iron (Fe) and other inevitable impurities, and the number of precipitates with an average diameter of 0.5 μm or less is $10^5$ pieces/mm$^2$ or less.

3 Claims, 2 Drawing Sheets

[FIG. 1]
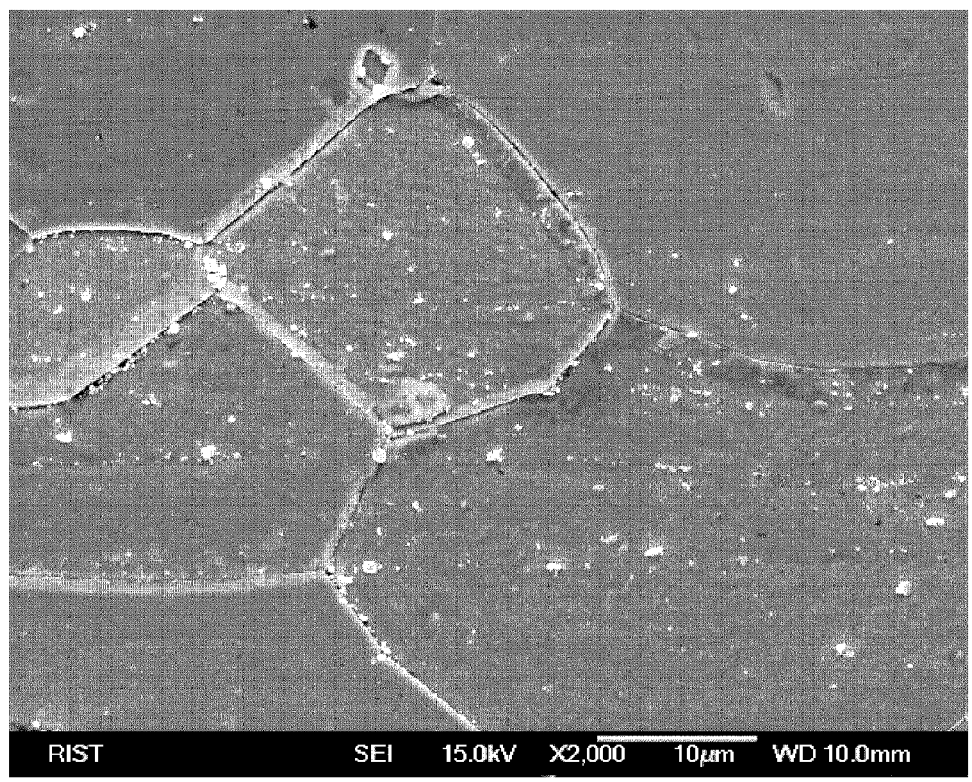

[FIG. 2]
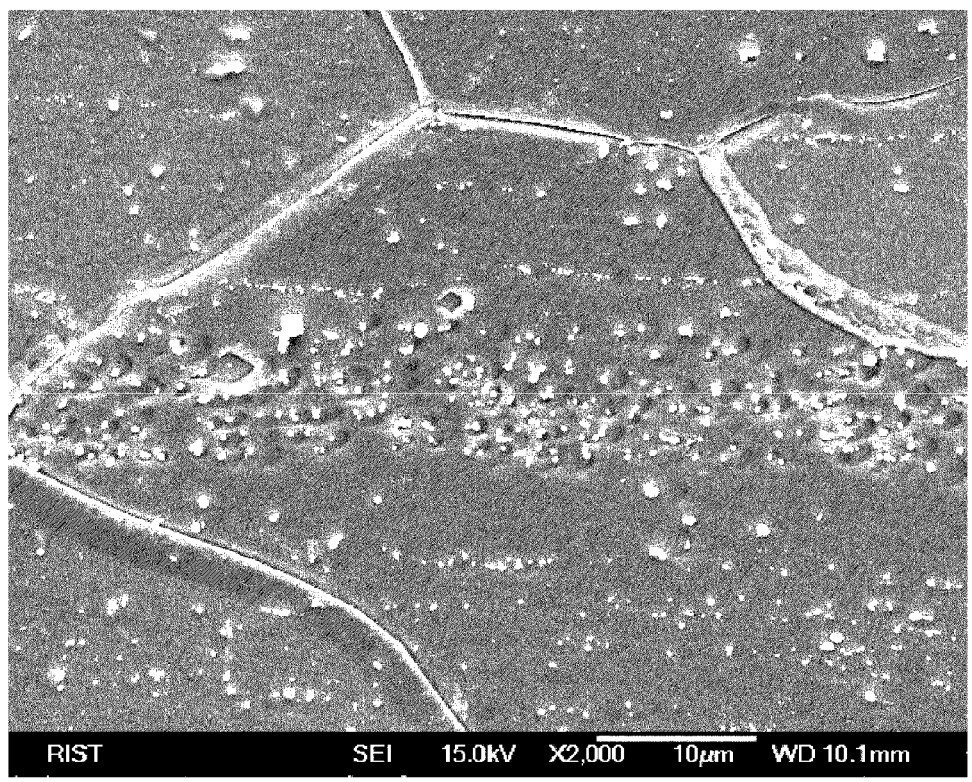

FERRITE-BASED STAINLESS STEEL HAVING EXCELLENT PROCESSABILITY AND HIGH-TEMPERATURE STRENGTH AND METHOD FOR MANUFACTURING SAME

CROSS-REFERENCE OF RELATED APPLICATIONS

This application is the U.S. National Phase under 35 U.S.C. § 371 of International Patent Application No. PCT/KR2019/010717, filed on Aug. 22, 2019, which claims the benefit of Korean Patent Application No. 10-2018-0112482, filed on Sep. 19, 2018, the entire disclosures of each are incorporated by reference herein.

TECHNICAL FIELD

The present disclosure relates to a ferritic stainless steel having excellent workability and high temperature strength, and more particularly, to a ferritic stainless steel capable of improving workability and high temperature strength through control of component composition and precipitate distribution, and a manufacturing method thereof.

BACKGROUND ART

A ferritic stainless steel is a steel with high price competitiveness compared to austenitic stainless steel because it has excellent corrosion resistance even with a small amount of expensive alloy elements added. Ferritic stainless steel is used for exhaust system parts (exhaust-manifold, collector cone) having an exhaust gas temperature of 800° C. or higher. The exhaust manifold of automobile exhaust system is directly exposed to high temperature exhaust gas of 800° C. or higher, and very high safety is required in a long operation environment. For this reason, many studies have been conducted on alloy components and manufacturing methods that improve high-temperature properties.

While many studies have been conducted on the influence of alloys such as Mo, Nb, etc., which are elements that improve high-temperature properties, but in fact, understanding of the effect of crystal grains and precipitates occurring inside the material at high temperatures on high temperature properties is inadequate. Only when the alloy composition and manufacturing conditions for these crystal grains and precipitates are optimized, it will be possible to apply it as a material for exhaust manifolds in automobile exhaust systems that are gradually increasing in performance.

DISCLOSURE

Technical Problem

Embodiments of the present disclosure are intended to improve workability and high temperature strength by optimizing the steel composition and manufacturing process to control the composition and distribution of precipitates in the final material,

Technical Solution

In accordance with an aspect of the present disclosure, a ferritic stainless steel excellent in workability and high temperature strength includes, in percent (%) by weight of the entire composition, C: 0.0005 to 0.02%, N: 0.005 to 0.02%, Si: 0.01 to 1.0%, Mn: 0.01 to 1.2%, P: 0.001 to 0.05%, Cr: 10.0 to 25.0%, Mo: 1.5 to 3.0%, Nb: 0.3 to 0.7%, W: 0.5 to 2.0%, the remainder of iron (Fe) and other inevitable impurities, and the number of precipitates with an average diameter of 0.5 μm or less is $10^5$ pieces/mi or less.

The precipitate may include Laves phase, and the Laves phase precipitate may include Mo Laves phase precipitate, Nb Laves phase precipitate, and W Laves phase precipitate.

The weight ratio of W to the total weight of the precipitate may be less than 20%.

The stainless steel may have a 25° C. elongation of 27% or more, and a 900° C. tensile strength of 45 MPa or more.

In accordance with an aspect of the present disclosure, a manufacturing method of a ferritic stainless steel excellent in workability and high temperature strength includes: rough rolling by reheating the slab including, in percent (%) by weight of the entire composition, C: 0.0005 to 0.02%, N: 0.005 to 0.02%, Si: 0.01 to 1.0%, Mn: 0.01 to 1.2%, P: 0.001 to 0.05%, Cr: 10.0 to 25.0%, Mo: 1.5 to 3.0%, Nb: 0.3 to 0.7%, W: 0.5 to 2.0%, the remainder of iron (Fe) and other inevitable impurities; finishing rolling the rough rolled bar; and winding the finished rolled hot-rolled steel sheet, and a holding time (seconds) before the start of finishing rolling of the rough rolled bar satisfies the following equation (1).

$$8{,}000/(RHT-1{,}000) \leq \text{holding time} \leq 120 \tag{1}$$

Here, RHT means reheating temperature (° C.).

The reheating temperature may be 1,100 to 1,300° C.

The rough rolling may have a total reduction ratio of 50% or more in the last two passes.

The coiling temperature may be 500 to 700° C.

Advantageous Effects

The ferritic stainless steel according to an embodiment of the present disclosure can provide a ferritic stainless steel having excellent workability and high temperature strength by reducing precipitates and increasing solid solution W.

In addition, the ferritic stainless steel according to an embodiment of the present disclosure may exhibit an elongation at room temperature of 27% or more and a high temperature strength of 900° C. of 45 MPa or more.

DESCRIPTION OF DRAWINGS

FIG. 1 is a SEM photograph showing the distribution of precipitates of ferritic stainless steel according to an embodiment of the present disclosure.

FIG. 2 is an SEM photograph showing the distribution of precipitates of ferritic stainless steel according to a comparative example.

BEST MODE

In accordance with an aspect of the present disclosure, a ferritic stainless steel excellent in workability and high temperature strength includes, in percent (%) by weight of the entire composition, C: 0.0005 to 0.02%, N: 0.005 to 0.02%, Si: 0.01 to 1.0%, Mn: 0.01 to 1.2%, P: 0.001 to 0.05%, Cr: 10.0 to 25.0%, Mo: 1.5 to 3.0%, Nb: 0.3 to 0.7%, W: 0.5 to 2.0%, the remainder of iron (Fe) and other inevitable impurities, and the number of precipitates with an average diameter of 0.5 μm or less is $10^5$ pieces/mi or less.

MODES OF THE INVENTION

Hereinafter, the embodiments of the present disclosure will be described in detail with reference to the accompanying drawings. The following embodiments are provided to transfer the technical concepts of the present disclosure to one of ordinary skill in the art. However, the present disclosure is not limited to these embodiments, and may be embodied in another form. In the drawings, parts that are irrelevant to the descriptions may be not shown in order to clarify the present disclosure, and also, for easy understanding, the sizes of components are more or less exaggeratedly shown.

Also, when a part "includes" or "comprises" an element, unless there is a particular description contrary thereto, the part may further include other elements, not excluding the other elements.

An expression used in the singular encompasses the expression of the plural, unless it has a clearly different meaning in the context.

For securing high temperature strength for securing workability for manufacturing as a part for automobile exhaust system and safety in a high-temperature operation environment, the present disclosure intends to provide ferritic stainless steel with improved workability and high temperature strength through precipitate control with addition of Mo, Nb, and W.

In accordance with an aspect of the present disclosure, a ferritic stainless steel excellent in workability and high temperature strength includes, in percent (%) by weight of the entire composition, C: 0.0005 to 0.02%, N: 0.005 to 0.02%, Si: 0.01 to 1.0%, Mn: 0.01 to 1.2%, P: 0.001 to 0.05%, Cr: 10.0 to 25.0%, Mo: 1.5 to 3.0%, Nb: 0.3 to 0.7%, W: 0.5 to 2.0%, the remainder of iron (Fe) and other inevitable impurities, and the number of precipitates with an average diameter of 0.5 μm or less is $10^5$ pieces/mi or less.

Hereinafter, the reason for the numerical limitation of the alloy component element content in the embodiment of the present disclosure will be described. In the following, unless otherwise specified, the unit is % by weight.

The content of C is 0.0005 to 0.02%.

C is an element that greatly affects the strength, and if the content is less than 0.0005%, the strength decreases and the refining price to make a high-purity product becomes high, and if it exceeds 0.02%, impurities in the material increase, resulting in lower elongation and work hardening index (n value), and higher DBTT, resulting in lower impact characteristics.

The content of N is 0.005 to 0.02%.

N is an element that promotes recrystallization by precipitating austenite during hot rolling. If the content is less than 0.005%, TiN crystallization decreases and the equiaxed grain ratio of the slab decreases. On the other hand, if it exceeds 0.02%, impurities in the material increase, resulting in lower elongation and work hardening index (n value), and higher DBTT, resulting in lower impact characteristics.

The content of Si is 0.01 to 1.0%.

Si is an element added for deoxidation of molten steel and stabilization of ferrite during steel making. If the content is less than 0.01%, there is a problem that the refining price increases, and if it exceeds 1.0%, the impurities of the material increase, resulting in elongation and work hardening index (n value) decreases and Si-based inclusions increase, resulting in poor workability.

The content of Mn is 0.01 to 1.2%.

Mn is an effective element for improving corrosion resistance, and if its content is less than 0.01%, there is a problem that the refining price increases, and if it exceeds 1.2%, impurities in the material increase and elongation decreases.

The content of P is 0.001 to 0.05%.

P is an impurity that is inevitably contained in steel and is an element that causes grain boundary corrosion during pickling or impairs hot workability, so it is desirable to control its content as low as possible. However, if it is controlled to less than 0.001%, the refining price increases, and if it exceeds 0.05%, the elongation and work hardening index decrease due to the increase in impurities.

The content of Cr is 10.0 to 25.0%.

Cr is an element effective in improving the corrosion resistance and oxidation resistance of steel, and it is added 10% or more in the present disclosure. However, if the content is excessive, elongation is lowered and hot-rolled sticking defects occur, so it is limited to 25.0% or less.

The content of Mo is 1.5 to 3.0%.

Mo increases the corrosion resistance of ferritic stainless steel and at the same time improves the high temperature strength. If the Mo content is less than 1.5%, the amount of solid solution in the material is small, which increases the probability of deterioration of high temperature strength and thermal fatigue properties and occurrence of abnormal oxidation. If it exceeds 3.0%, the impact properties are deteriorated, resulting in a high risk of fracture during processing, and there is a problem of cost increase.

The content of Nb is 0.3 to 0.7%.

Nb combines with solid solution C to precipitate NbC, thereby lowering the solid solution C content, increasing corrosion resistance, and increasing high temperature strength. If the Nb content is less than 0.3%, there is a problem that the high temperature strength decreases due to a small amount of solid solution in the material. If it exceeds 0.7%, the amount of Nb-based precipitate and solid solution increases excessively, resulting in lower elongation and impact properties.

The content of W is 0.5 to 2.0%.

W increases the corrosion resistance of ferritic stainless steel and at the same time improves the high temperature strength. Therefore, it is preferable to add 0.5% or more, and if it is less than 0.5%, there is a problem that the high temperature strength decreases due to a small amount of solid solution in the material. On the other hand, when it exceeds 2.0%, excessive precipitates are generated, and there is a problem that cracks occur during processing.

According to the component composition of the present disclosure described above, the precipitates including the Laves phase are precipitated, and the Laves phase precipitate may be $[Fe,Cr]_2[Mo,Nb,W]$. That is, the Laves phase precipitate may include a Mo Laves phase precipitate, an Nb Laves phase precipitate, and a W Laves phase precipitate. By controlling these precipitates, it is possible to secure workability and high temperature strength for manufacturing a part for automobile exhaust system.

In the ferritic stainless steel according to an embodiment of the present disclosure, the number of precipitates having an average diameter of 0.5 μm or less may be $10^5$ pieces/mm$^2$ or less.

In addition, according to an embodiment of the present disclosure, the weight ratio of W to the total weight of the precipitate may be less than 20%. That is, the ratio of the W weight in $[Fe,Cr]_2[W]$ to the total weight of the laves phase precipitate that can be expressed as $[Fe,Cr]_2[Mo,Nb,W]$ may be less than 20%, and the high temperature strength can be improved by sufficiently securing a sufficient amount of solid solution in the W matrix. When the Laves phase precipitate containing W is excessively precipitated, the high temperature strength decreases due to the decrease in solid solution W and the risk of brittle fracture increases. Therefore, the W weight ratio to the total weight of the Laves phase precipitate is preferably less than 20%.

Accordingly, the ferritic stainless steel according to an embodiment of the present disclosure may satisfy 25° C. room temperature elongation of 27% or more and 900° C. tensile strength of 45 MPa or more.

Next, a manufacturing method of a ferritic stainless steel excellent in workability and high temperature strength according to an embodiment of the present disclosure will be described.

The ferritic stainless steel excellent in workability and high temperature strength in the present disclosure needs to control the size and distribution of fine precipitates to secure workability and high temperature strength. Therefore, not only the component control but also the control of the hot rolling process is required.

It can be made of a hot-rolled annealed material through hot rolling and annealing process, for example, the slab including, in percent (%) by weight of the entire composition, C: 0.0005 to 0.02%, N: 0.005 to 0.02%, Si: 0.01 to 1.0%, Mn: 0.01 to 1.2%, P: 0.001 to 0.05%, Cr: 10.0 to 25.0%, Mo: 1.5 to 3.0%, Nb: 0.3 to 0.7%, W: 0.5 to 2.0%, the remainder of iron (Fe) and other inevitable impurities can be reheated and rough rolled, the rough rolled bar is finished rolled, the finished rolled hot-rolled steel sheet is wound, and the wound hot-rolled coil can be annealed.

First, in order to re-decompose coarse precipitates generated during slab casting, the hot rolling reheating temperature of the slab must be controlled to 1,100° C. or higher, and if the reheating temperature is too high, grains may become coarse, so it is limited to 1,300° C. or less.

Subsequently, in the rough rolling process, the total reduction ratio of the last two passes of rough rolling may be 50% or more in order to impart strain energy. Rough rolling is usually composed of 3 to 4 rolling mills, and the last 2 passes in the present disclosure may mean the last rolling mill and the second rolling mill from the last. By rolling strongly so that the sum of the reduction ratio of the last two passes is 50% or more, dislocation generation can be smoothly performed.

A holding time (seconds) before the start of finishing rolling of the rough rolled bar may satisfy the following equation (1).

$$8{,}000/(RHT-1{,}000) \leq \text{holding time} \leq 120 \qquad (1)$$

Here, RHT means reheating temperature (° C.).

A sufficient recrystallization time is given by setting the holding time until finishing rolling after rough rolling to 8,000/(RHT−1,000) seconds or more, and by limiting the holding time to 120 seconds or less, coarsening of grains is prevented. This is to prevent coarsening of the precipitates and allow them to be dissolved in the later annealing process by giving more deformed structure during finishing rolling.

In addition, the coiling temperature of the finished rolled hot-rolled steel sheet may be 500 to 700° C. The coiling temperature should be controlled to 700° C. or less to prevent coarsening of the precipitates precipitated during hot rolling and not to increase the W weight ratio in the laves phase precipitate, and it is preferable to control it to 500° C. or higher for shape and surface quality.

Hereinafter, it will be described in more detail through a preferred embodiment of the present disclosure.

EXAMPLE

Using the stainless steel lab scale melting and ingot production facilities, a 20 mm bar sample was prepared with the alloy component shown in Table 1 below. After hot rolling to 6 mm according to the reheating temperature, reduction ratio, holding time according to Equation (1), and coiling temperature as shown in Table 2, hot rolling annealing was performed at 1,100° C., and after cold rolling to 2.0 mm, it was annealed at 1,100° C. to produce a final product.

TABLE 1

| Steel grade | C | N | Si | Mn | P | Cr | Mo | Nb | W | |
|---|---|---|---|---|---|---|---|---|---|---|
| A | 0.0088 | 0.0114 | 0.3 | 0.4 | 0.02 | 18 | 1.1 | 0.52 | 1.2 | Comparative example |
| B | 0.0104 | 0.0083 | 0.2 | 0.5 | 0.03 | 17.8 | 2.0 | 0.65 | 0.3 | Comparative example |
| C | 0.0089 | 0.0091 | 0.3 | 0.4 | 0.02 | 18.4 | 1.9 | 0.21 | 0.4 | Comparative example |
| D | 0.0123 | 0.0102 | 0.4 | 0.3 | 0.03 | 18.6 | 2.5 | 0.14 | 0.3 | Comparative example |
| E | 0.0092 | 0.0090 | 0.2 | 0.4 | 0.02 | 22.4 | 1.7 | 0.53 | 1.7 | Inventive example |
| F | 0.0096 | 0.0110 | 0.3 | 0.4 | 0.02 | 18.2 | 2.1 | 0.56 | 1.1 | Inventive example |
| G | 0.0134 | 0.0097 | 0.3 | 0.5 | 0.02 | 16.4 | 2.3 | 0.55 | 0.7 | Inventive example |

TABLE 2

| Steel grade | reheating temperature (° C.) | Total reduction ratio of the last 2 passes of rough rolling (%) | Equation (1) Holding time (seconds) | coiling temperature (° C.) | |
|---|---|---|---|---|---|
| A | 1,220 | 64 | 80 | 600 | Comparative example 1 |
| B | 1,220 | 45 | 150 | 600 | Comparative example 2 |

TABLE 2-continued

| Steel grade | reheating temperature (° C.) | Total reduction ratio of the last 2 passes of rough rolling (%) | Equation (1) Holding time (seconds) | coiling temperature (° C.) | |
|---|---|---|---|---|---|
| C | 1,220 | 64 | 80 | 600 | Comparative example 3 |
| D | 1,220 | 64 | 80 | 600 | Comparative example 4 |
| E | 1,220 | 45 | 150 | 600 | Comparative example 5 |
| F | 1,220 | 45 | 150 | 600 | Comparative example 6 |
| G | 1,220 | 64 | 80 | 800 | Comparative example 7 |
| E | 1,220 | 64 | 80 | 600 | Inventive example 1 |
| F | 1,220 | 64 | 80 | 600 | Inventive example 2 |
| G | 1,220 | 64 | 80 | 600 | Inventive example 3 |

For the final cold-rolled steel sheet prepared as above, elongation was evaluated by stretching at room temperature, and high temperature tensile strength was evaluated. High-temperature tensile strength was evaluated by conducting a test at 900° C. according to the JIS G 0567 method.

TABLE 3

| | Steel grade | Number of precipitates of 0.5 μm or less in diameter ($10^3$/mm$^2$) | W weight ratio to the total weight of the laves phase precipitate (%) | elongation (%) | 900° C. tensile strength (MPa) |
|---|---|---|---|---|---|
| Comparative example 1 | A | 72 | 18 | 28 | 38 |
| Comparative example 2 | B | 155 | 4 | 25 | 43 |
| Comparative example 3 | C | 45 | 3 | 27 | 37 |
| Comparative example 4 | D | 34 | 5 | 28 | 41 |
| Comparative example 5 | E | 340 | 11 | 24 | 46 |
| Comparative example 6 | F | 230 | 19 | 25 | 47 |
| Comparative example 7 | G | 55 | 49 | 29 | 41 |
| Inventive example 1 | E | 51 | 15 | 28 | 52 |
| Inventive example 2 | F | 67 | 12 | 29 | 50 |
| Inventive example 3 | G | 34 | 8 | 30 | 47 |

FIG. 1 is a SEM photograph showing the distribution of precipitates of ferritic stainless steel according to an embodiment of the present disclosure. FIG. 2 is an SEM photograph showing the distribution of precipitates of ferritic stainless steel according to a comparative example.

As shown in FIGS. 1 and 2, in the embodiment manufactured according to the present disclosure, it can be seen that less precipitates having a diameter of 0.5 μm or less are distributed. In the comparative example, it can be seen that the precipitate was relatively coarse and a large amount of the precipitate was precipitated.

Comparative Examples 1 to 4 are for steel grades A to D that deviate from the alloy composition of the present disclosure, and specifically, are steel grades with insufficient contents of Mo, Nb, and W related to high temperature strength. Even if these are manufactured by the manufacturing method according to the present disclosure as shown in Table 2, the precipitate diameter, number, and W weight ratio are satisfied, but it can be seen that the 900° C. high temperature strength is less than the target value due to the lack of solid solution amount.

Comparative Examples 5 to 7 are for steel grades E to G that satisfy the composition of the alloy components of the present disclosure, and even if the alloy composition is satisfied, when the manufacturing method conditions are not satisfied, a large amount of precipitate is precipitated or W is not sufficiently dissolved.

Inventive Examples 1 to 3 are cases in which both the alloy composition and manufacturing method conditions of the present disclosure are satisfied, it was found that both the distribution of the precipitate and the properties of the steel material to be achieved were satisfied.

In the above description, exemplary embodiments of the present disclosure have been described, but the present disclosure is not limited thereto. Those of ordinary skill in the art will appreciate that various changes and modifications can be made without departing from the concept and scope of the following claims.

INDUSTRIAL APPLICABILITY

The ferritic stainless steel according to the present disclosure has excellent workability and high temperature strength, so it can provide high durability and safety in a long operation environment directly exposed to high temperature exhaust gas of 700° C. or higher.

The invention claimed is:

1. A ferritic stainless steel comprising, in percent (%) by weight of the entire composition, C: 0.0005 to 0.02%, N: 0.005 to 0.02%, Si: 0.01 to 1.0%, Mn: 0.01 to 1.2%, P: 0.001 to 0.05%, Cr: 10.0 to 25.0%, Mo: 1.5 to 3.0%, Nb: 0.3 to 0.7%, W: 0.5 to 2.0%, and the remainder of iron (Fe), wherein the ferritic stainless steel includes precipitates including a Laves phase precipitate comprising a Laves phase, wherein the Laves phase precipitate comprises Mo Laves phase precipitate, Nb Laves phase precipitate, and W Laves phase precipitate, wherein a number of precipitates with an average diameter of 0.5 μm or less is $10^5$ pieces/mm$^2$ or less, and wherein a weight ratio of W to a total weight of the Laves phase precipitate is less than 20%.

2. The ferritic stainless steel of claim 1, wherein the stainless steel has an elongation of 27% or more at 25° C., and a tensile strength of 45 MPa or more at 900° C.

3. The ferritic stainless steel of claim 1, comprising, in percent (%) by weight of the entire composition, Mn: 0.01 to 0.5%.

* * * * *